United States Patent [19]

Bender

[11] 4,326,749
[45] Apr. 27, 1982

[54] COUPLING CONSTRUCTION

[75] Inventor: Fredrick L. Bender, Saginaw, Mich.

[73] Assignee: Bender's Sales & Service, Inc., Saginaw, Mich.

[21] Appl. No.: 99,839

[22] Filed: Dec. 3, 1979

[51] Int. Cl.³ .......................... B60P 1/28; F01B 15/04
[52] U.S. Cl. .................................. 298/22 R; 92/52; 92/118
[58] Field of Search ...................... 92/52, 53, 51, 118; 298/22 R, 22 D

[56] References Cited

U.S. PATENT DOCUMENTS

| 1,819,411 | 8/1931 | Flowers | 298/22 R |
| 2,593,055 | 4/1952 | Rockwell | 92/52 |
| 2,597,419 | 5/1952 | Westbury | 92/52 |
| 2,811,137 | 10/1957 | Hartel | 92/52 |
| 2,854,958 | 10/1958 | Wood | 92/53 |
| 3,595,525 | 7/1971 | Yaste | 92/53 |
| 3,658,189 | 4/1972 | Brown | 92/52 |
| 4,060,221 | 11/1977 | Rilbe | 92/53 |

FOREIGN PATENT DOCUMENTS

| 454603 | 2/1949 | Canada | 298/22 R |
| 2157346 | 5/1973 | Fed. Rep. of Germany | 92/53 |
| 837871 | 6/1960 | United Kingdom | 298/22 R |

Primary Examiner—Abraham Hershkovitz
Attorney, Agent, or Firm—Learman & McCulloch

[57] ABSTRACT

A coupling for use in a vehicle having an extensible and retractable ram reacting between the vehicle frame and a rockable dump body for raising and lowering the latter comprises a pair of parallel links straddling the ram and being pivoted at corresponding ends to the body and at their opposite ends to the ram. The pivotal connection of the links to the body preferably is of the ball joint type to enable substantially universal movement of the links relative to the ram. The coupling enables limited relative movement between the body and the vehicle frame without necessitating extension and retraction of the ram.

11 Claims, 9 Drawing Figures

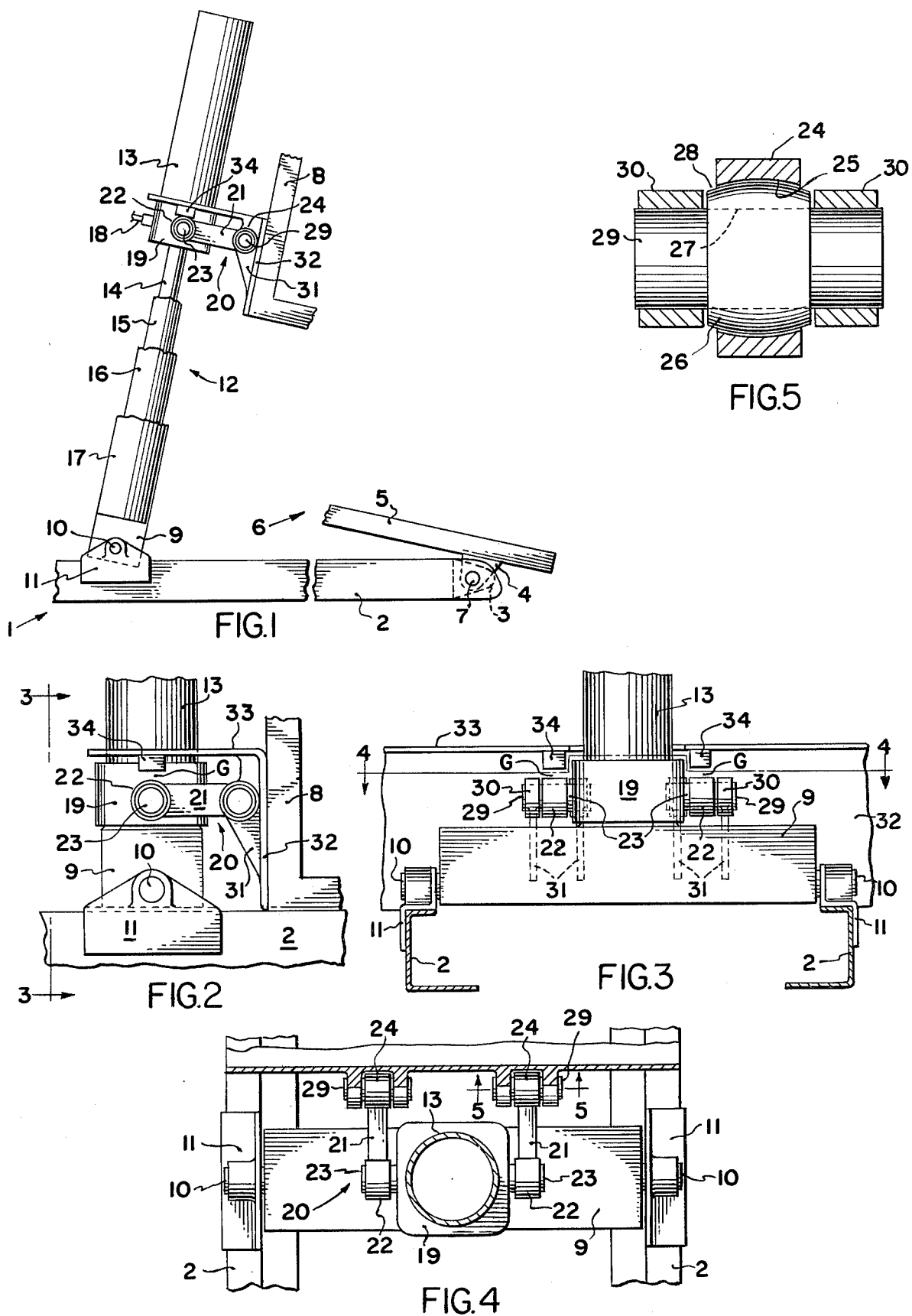

COUPLING CONSTRUCTION

BACKGROUND OF THE INVENTION

The invention relates to a vehicle of the kind having a body pivoted to the vehicle frame in such manner as to enable the body to rock about a substantially horizontal axis and permit the contents of the body to be dumped. Raising and lowering movements of the body are effected by means of an extensible and retractable ram having a cylinder within which is a plurality of telescoping piston sections. In conventional constructions one end of the ram is pivoted either to the body or to the vehicle frame and the other end of the ram is pivoted to the frame or to the body so that extension of the ram will cause the body to swing upwardly about its pivotal connection to the frame. Vehicles of the kind with which the invention is concerned include bodies such as those manufactured by Edbro Incorporated, Orland Park, Ill., and Perfection-Cobey Co., Galion, Ohio, among others. Extensible and retractable rams suitable for use with such bodies are available from the aforementioned manufacturers, from Hyco, Inc., Ashland, Ohio, and others. A typical ram suitable for use in the aforementioned environment is illustrated in Wood et al U.S. Pat. No. 2,854,958.

Although the means known heretofore for coupling rams between the vehicle frames and the dump bodies often function well in the raising and lowering of such bodies, they do have certain disadvantages. For example, when an unloaded vehicle has its body in a lowered position and is driven at speed over rough terrain, railroad tracks, and the like, it is not uncommon for that end of the body to which the ram is coupled to vibrate or bounce vertically. If the pivotal connection between the ram and the body is rigid, the vertical vibration is transmitted to the seals between the ram cylinder and its piston, thereby subjecting the seals to excessive wear and premature failure. If the pivotal connection between the ram and the body or vehicle frame is of the pin and slot type so as to provide for lost motion, the clearance between the pin and the end of the slot either is insufficient to compensate for vertical vibration or promotes excessive noise with corresponding wear of parts.

Another disadvantage of pivotal couplings of the kind referred is that they oftentimes are subjected to lateral forces caused by uneven loading of the vehicle or by the vehicle's being on uneven terrain during body-hoisting operations. This is true even if the pivotal connections of the body to the vehicle frame do not allow for relative vertical movement of the opposite sides of the body, for the reason that the body itself is capable of limited torsional or twisting movements from one end to the other. In those instances in which the body is subjected to lateral torsional or gravitational forces, the rigid pivotal connections between the ram, the body, and the vehicle frame are subjected to severe stresses which may result in failure.

An object of the invention is to provide coupling means for coupling an extensible and retractable ram between a vehicle frame and a vertically swingable body and which overcomes the disadvantages referred to above.

SUMMARY OF THE INVENTION

A coupling constructed in accordance with the invention comprises a link assembly having a pair of parallel links pivoted at corresponding ends to an extensible and retractable ram for rotation about coincidental axes and pivoted at their opposite ends to a vertically swingable vehicle body in such manner as to permit substantially universal rocking movement of the ram relative to the body. The connection between the links and the body preferably comprises a ball joint which permits the desired movement of the ram to be attained reliably and economically.

DESCRIPTION OF THE DRAWINGS

Apparatus constructed in accordance with the invention is illustrated in the accompanying drawings, wherein:

FIG. 1 is a fragmentary, side elevational view of a coupling extending between a vehicle body and one end of a hydraulic ram, the opposite end of the ram being pivoted to the vehicle frame, and illustrating the body in a partially raised position;

FIG. 2 is a fragmentary view, similar to FIG. 1, but illustrating the parts of the apparatus and the positions they occupy when the vehicle body is in a fully lowered position;

FIG. 3 is a sectional view taken on the line 3—3 of FIG. 2;

FIG. 4 is a sectional view taken on the line 4—4 of FIG. 3.

FIG. 5 is an enlarged, sectional view taken on the line 5—5 of FIG. 4;

DETAILED DESCRIPTION OF THE INVENTION

Figure 6:
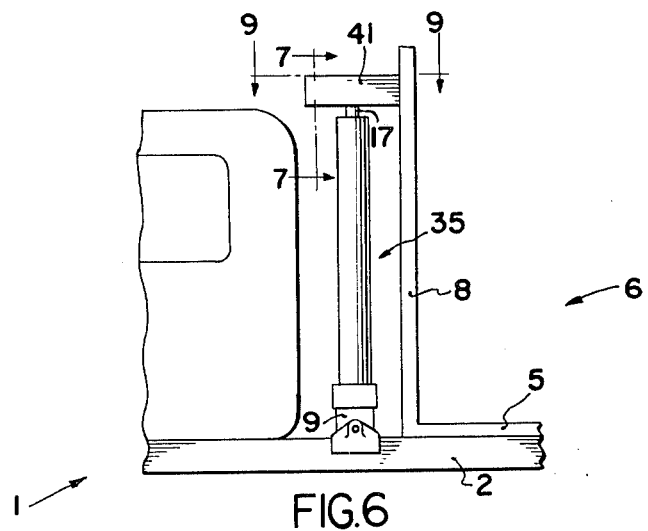
FIG. 6 is a fragmentary, side elevational view of the coupling constructed in accordance with the invention and applied to a vehicle in a somewhat different manner, the body of the vehicle being illustrated in its fully lowered position.
Figure 7:
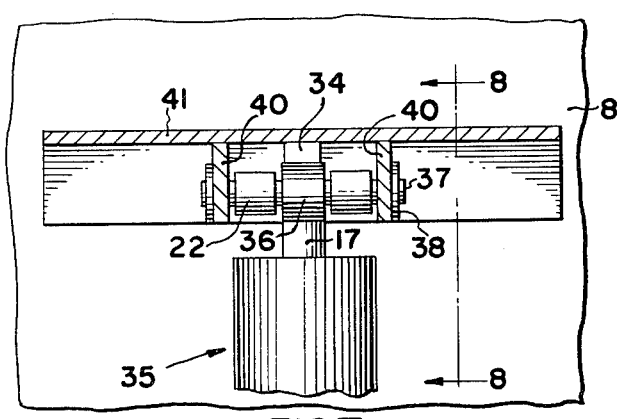
FIG. 7 is a sectional view, on an enlarged scale, and taken on the line 7—7 of FIG. 6.
Figure 8:
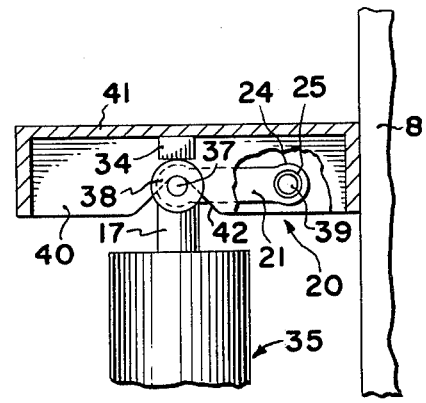
FIG. 8 is a sectional view taken on the line 8—8 of FIG. 7.
Figure 9:
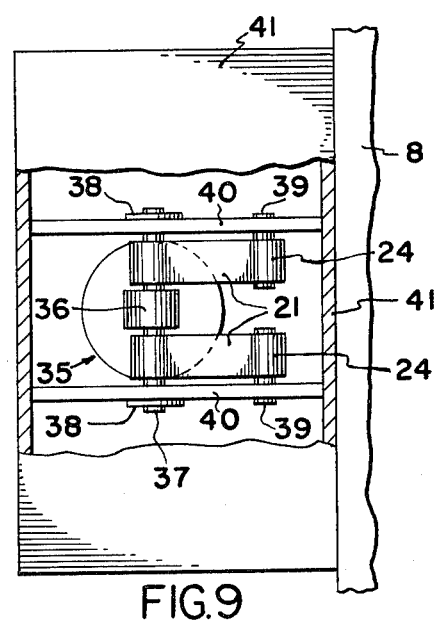
FIG. 9 is a sectional view taken on the line 9—9 of FIG. 6.

Coupling apparatus constructed in accordance with the invention is adapted for use in conjunction with a wheeled motor vehicle 1 having a parallel chassis or frame members 2 at the rear end of which is a plurality of spaced apart blocks, one of which is shown at 3 in FIG. 1. Associated with each block 3 is a bracket 4 rigidly fixed to the bottom of the load carrying bed 5 of the vehicle body 6. The members 3 and 4 are pivoted to one another by pins 7 so as to enable the body 6 to be raised and lowered about the axes of the pins 7.

In the embodiment shown the vehicle body 6 has a front wall 8. The body also may have sidewalls and a rear gate, if desired.

The frame members 2 are spanned by a support 9 having laterally projecting pins 10 which are rotatably accommodated in brackets 11 fixed on the frame members 2 so as to enable the support to rock about a horizontal axis.

Vehicles of the kind herein disclosed conventionally utilize a hydraulic ram for effecting swinging movements of the body 6 between raised and lowered positions. Such a ram is designated generally by the reference character 12 and comprises a cylinder 13 within which is contained a plurality of relatively telescoping, coaxial piston sections 14, 15, 16, and 17. The piston sections 14, 15, and 16, receive and slideably accommodate the piston sections 15, 16, and 17, respectively, in a manner well known in the art. Between the cylinder 13 and the piston section 14 are seals (not shown) and similar seals also are provided between each of the piston sections 14, 15; 15, 16; and 16, 17 in a manner also well known in the art. The piston sections 14–17 are longitudinally extensible and retractable relative to the cylinder 13 and to each other by hydraulic fluid which is admitted to and withdrawn from the cylinder 13 by means of a conduit 18 connected to a pump (not shown) through appropriate valving.

The mouth end of the cylinder 13 is provided with a collar 19 and the outer end of the piston section 17 is fixed to the support 9 in any suitable manner.

The apparatus thus far described is conventional and forms no part of the invention per se, aside from the manner in which the several parts cooperate with one another.

A pivotal coupling constructed in accordance with the invention is designated generally by the reference character 20 and comprises a pair of spaced apart, parallel links 21 which straddle the collar 19 of the ram 12 and extend transversely of the longitudinal axis of the latter. The links have forward ends 22 pivoted to studs 23 which extend from opposite sides of the collar 19. The centers of the studs lie in the same vertical plane as the center of the pivot pins 10.

At the rear end of each link 21 is an enlargement 24 having an opening 25 therethrough provided with an arcuate, concave surface. Rotatably accommodated in each opening 25 is a fitting 26 having a transverse bore 27 therein and a convex outer surface 28 having a curvature complementary to that of the curvature of the opening 25. The connection between the link and the fitting is like a ball and socket joint, as a consequence of which the fitting 26 is rotatable relative to the link 21 about the longitudinal axis of the bore 27 and, in addition, is rotatable relative to the link 21 about the longitudinal axis of the latter.

Accommodated in and extending through the bore 27 of the fitting 26 is a pin 29 which is of such length as to project beyond the fitting 26. The ends of the pin 29 are accommodated in correspondingly bored ears 30 which are carried by forwardly extending ribs 31 supported on and forming a part of a bracket 32 that is welded or otherwise fixed to the forward wall 8 of the vehicle body 6.

The bracket 32 includes a forwardly extending ledge 33 having an opening through which the ram cylinder extends. The ledge overhangs the links 21 and carries a pair of blocks 34 which confront the enlarged ends 22 of the links. The purpose of the blocks will be explained hereinafter.

The embodiment illustrated in FIGS. 6–9 is similar in many respects to that earlier described. In the modified embodiment, however, a ram 35, similar in all respects to the ram 12, is reversed so that its closed end is secured to the support 9 and the endmost piston element 17 is uppermost. At the free end of the piston 17 is a bored enlargement 36 through which extends an elongate pin 37 and on which corresponding ends of the coupling links 21 are pivoted. Washers or flanges 38 are fixed to the free ends of the pin 37. The opposite ends 24 of the links 21, like those earlier described, are provided with the fittings 26 through each of which entends a pin 39 which, in this case, has one end thereof secured to a rib 40 forming part of a bracket 41 that is fixed to the front wall 8 of the body 6. Each rib has an inverted V-shaped notch 42 therein for the accommodation of the elongate pivot pin 37. The provision of the notches 42 enables relative movement between the ram 35 and the body 6 in a manner and for a purpose presently to be explained.

When the parts of the apparatus shown in FIGS. 1–5 are assembled in the manner shown and when the vehicle body 6 is in the lowered position illustrated in the FIG. 3, the ram 12 will be in its retracted position, and the bed 5 of the vehicle body will rest upon the frame members 2. A gap G (FIGS. 2 and 3) of about one-half to one inch will exist between the link ends 22 and the blocks 34. If the body is empty and the vehicle is driven over rough terrain, the body is susceptible to vibration such that its forward end rises and falls. Should this occur, upward movement of the forward end of the body the full height of the gap G may occur without corresponding movement of the ram cylinder 12 inasmuch as the links 21 may rock counterclockwise (as viewed in FIG. 3) about the axes of the pins 23, which axes are parallel to the axis about which the body rotates. Since the upward movement of the forward end of the vehicle body due to vibration is relatively small, such as one fourth inch or less, such movement may be compensated for entirely by the rocking of the links 21 so as to avoid any vertical movement of the ram cylinder. Consequently, the seals between the cylinder and the piston sections are not subjected to vibratory motions.

When it is desired to raise the body 6, the ram 12 may be actuated to extend the piston portions 14–17. Actuation of the ram does not effect raising of the body until such time as the ends 22 of the links 21 traverse the gap G and engage the blocks 34. Thereafter, further extension of the ram will effect upward movement of the forward end of the body.

When the ram 12 is extended so as to raise the vehicle body 6 to the position shown in FIG. 1, or higher, there is a possibility that the body may twist due to uneven loading, or due to the vehicle's resting on the surface which is inclined toward one side or the other of the vehicle. The extent to which the body may be twisted is limited by the inherent strength of the body and by its pivotal connections to the vehicle frame, but any such twisting would impose torsional forces on the ram were it not for the construction of the coupling 20.

Referring to FIG. 4, and assuming that the body 6 is in an elevated position, should the body twist counterclockwise, the right hand link 21 may rotate counterclockwise about the axis of its pivot pin 23 and the left hand link 21 may rotate clockwise about its pivot pin 23. These movements in opposite directions of the links 21 will cause their rear ends 24 to move to different levels. Such movement is permitted because of the ability of the links to rotate relatively to the fittings 26 independently of each other and about the longitudinal axes of the links which axes, although coplanar with the axes of the pins 29, are normal to the latter. As a consequence, the limited twisting movement of the vehicle body does not impose any substantial torsional forces on the ram.

When the apparatus is assembled in the manner shown in FIGS. 6–9 and when the vehicle body 6 is in its lowermost position as illustrated in FIG. 6, driving of the vehicle across uneven terrain may cause the forward end of the body 6 to vibrate vertically. Again, the ability of the links 21 to pivot about the respective pins 37 and 38 enables such vibratory movement to be compensated for without corresponding movement of the piston elements of the ram. The provision of the notches 42 enables the bracket 41 to partake of vibratory movement of the body 6 without imposing corresponding movements on the piston elements of the ram.

Should the body illustrated in FIG. 6 be subjected to twisting forces, the coupling will function in the same manner as described earlier.

The disclosed embodiments are representative of presently preferred forms of the invention, but are intended to be illustrative rather than definitive thereof. The invention is defined in the claims.

I claim:

1. In a vehicle having a frame member, a body member pivoted on said frame member for rocking movement about an axis between raised and lowered positions, and a ram pivotally connected to and reacting between said members and being extensible and retractable along its longitudinal axis to rock said body member about said axis, said body member in its lowered position being capable of vertical vibration, the improvement wherein the connection of said ram to one of said members comprises coupling means constituting at least one link having a pivotal connection at one end directly and only to said ram and a pivotal connection at its other end directly and only to said one of said members, said link extending transversely of the longitudinal axis of said ram and enabling limited vibratory movement of said body member in its lowered position without extension or contraction of said ram, at least one of said pivotal connections enabling substantially universal relative pivotal movement between said ram and said one of said members.

2. The construction according to claim 1 wherein said link is rockable at each end thereof about an axis substantially parallel to the axis of rocking of said body member.

3. The construction according to claim 1 wherein said link is rockable at one end thereof about an axis substantially parallel to the axis of rocking of said body member and at the other end about two substantially normal axes in the same plane, one of said two axes being substantially parallel to the axis of rocking of said body member.

4. The construction according to claim 1 wherein said ram is coupled to said body member.

5. The construction according to claim 1 wherein said ram comprises a cylinder connected to one of said members and at least one piston telescoped within said cylinder, said piston having a free end connected by said coupling means to the other of said members.

6. The construction according to claim 1 wherein said ram comprises a cylinder connected to one of said members and a plurality of relatively telescoped pistons within said cylinder, one of said pistons constituting an endmost piston and being connected at its free end by said coupling means to the other of said members.

7. The construction according to claim 1 wherein the pivotal connection at said other end of said link comprises a ball and socket connection.

8. In a vehicle having a frame member, a body member pivoted on said frame member for rocking movement about an axis between raised and lowered positions, and a ram pivotally connected to and reacting between said members and being extensible and retractable along its longitudinal axis to rock said body member about said axis, said body member in its lowered position being capable of vertical vibration, the improvement wherein the connection of said ram to one of said members comprises coupling means constituting at least one link having a pivotal connection at one end directly and only to said ram and a pivotal connection at its other end directly and only to said one of said members, said link extending transversely of the longitudinal axis of said ram and enabling limited vibratory movement of said body member in its lowered position without extension or contraction of said ram.

9. The construction according to claim 8 wherein said coupling means comprises a pair of spaced, parallel links pivoted at corresponding ends for movements about a pair of normal axes in the same plane.

10. The construction according to claim 9 wherein said corresponding ends of said links are pivoted by means of ball and socket connections.

11. The construction according to claim 9 wherein each of said links is pivotal independently of the other.

* * * * *